(12) United States Patent
Miinalainen et al.

(10) Patent No.: US 7,040,555 B2
(45) Date of Patent: May 9, 2006

(54) NOZZLE UNIT

(75) Inventors: Timo Miinalainen, Puhos (FI); Gatja Ronka, Puhos (FI); Jouni Rainio, Puhos (FI); Ari-Pekka Tiusanen, Lappeenranta (FI); Petri Lammi, Lappeenranta (FI)

(73) Assignee: Raute Oyj, Nastola (FI)

( * ) Notice: Subject to any disclaimer, the term of this patent is extended or adjusted under 35 U.S.C. 154(b) by 0 days.

(21) Appl. No.: 10/749,866

(22) Filed: Dec. 31, 2003

(65) Prior Publication Data

US 2004/0195392 A1 Oct. 7, 2004

(30) Foreign Application Priority Data

Dec. 31, 2002 (FI) .................................. 20022290

(51) Int. Cl.
*A62C 37/20* (2006.01)

(52) U.S. Cl. .................. 239/562; 239/76; 239/565; 239/124

(58) Field of Classification Search ............ 239/76, 239/450, 536, 565, 124, 562

See application file for complete search history.

(56) References Cited

U.S. PATENT DOCUMENTS

| | | | | |
|---|---|---|---|---|
| 753,730 A | * | 3/1904 | Owen | 239/562 |
| 1,394,721 A | * | 10/1921 | Festa | 239/550 |
| 1,409,259 A | * | 3/1922 | Sykora | 239/565 |
| 3,722,469 A | * | 3/1973 | Bartley et al. | 118/414 |
| 3,965,860 A | | 6/1976 | Cone et al. | |
| 4,420,510 A | | 12/1983 | Kunkel et al. | |
| 4,470,789 A | | 9/1984 | Whittington et al. | |

* cited by examiner

*Primary Examiner*—Christopher Kim
(74) *Attorney, Agent, or Firm*—Merchant & Gould P.C.

(57) ABSTRACT

A nozzle unit for the spreading of foamed glue onto a flat surface in the production of wood-based sheets, wherein the nozzle unit has a feeder canal (1) for directing glue into the nozzle unit, a row of nozzles (5) for directing glue from the nozzle unit onto a flat surface and also a distribution canal network between the feeder canal and the nozzles for distributing glue evenly to the nozzles. According to the invention, the area of the distribution canal network has a compensation canal (9) closed to/from external, that forms a free flow channel between the branches of the distribution canal network leading to the nozzles (5).

5 Claims, 2 Drawing Sheets

NOZZLE UNIT

Figure 1:
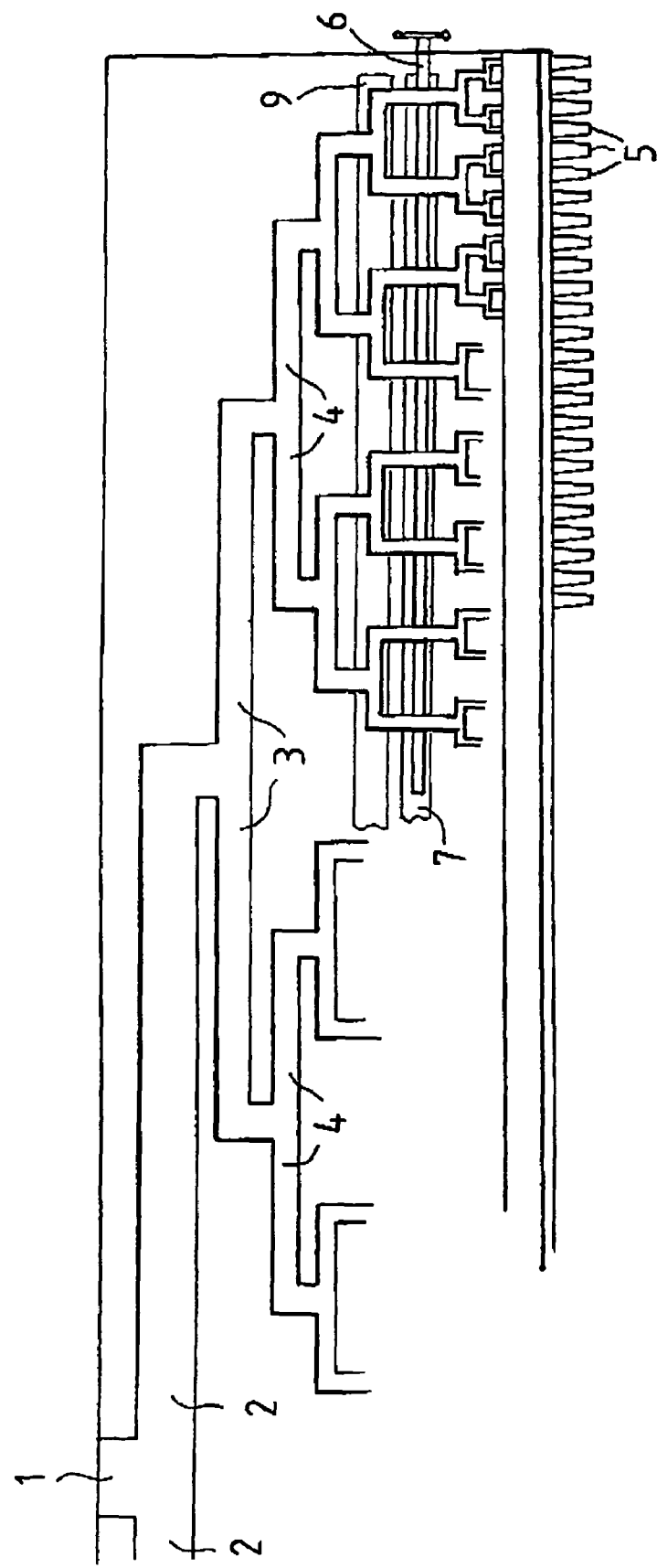

The invention relates to a nozzle unit according to the introduction of claim 1 for spreading foamed glue onto a flat surface in the production of wood-based sheets. In particular the invention is intended for spreading glue on veneer surfaces when producing plywood.

Foamed glues are generally used in the production of plywood and similar wood sheets. The main reasons for their use are minimal consumption and even distribution of the glue. Foamed glue does not need to be spread in an even layer across the entire surface to be glued, rather an even distribution of lines of glue for example is enough that when the surfaces are squeezed against one another the glue will spread to form an even layer across the entire area of the opposing surfaces.

The spreading of foamed glue is therefore generally done by a nozzle unit in which a large number of adjacent nozzles direct foamed glue into parallel lines on a surface to be glued. Generally the nozzle unit is kept stationary and the surfaces to be glued, such as plywood veneers are moved under the nozzle unit at a suitable speed leaving glue in one-directional lines across the surface of the veneer.

The nozzle unit has a feeder canal that splits in the area of the distribution canal network to form as many flow canals as there are nozzles in the nozzle unit. Generally the feeder canal first divides into two equal-sized flow canals that compose the first canal zone. After this each of these flow canals divide into two, in other words a sum total of four equal-sized flow canals that make up the second canal zone. In this way the flow canals continue to split to form in the next canal zone more flow canals of smaller flow cross-section, such that in the end in the last canal zone there are as many flow canals as there are nozzles. Generally all the flow canals of a canal zone are of equal flow resistance, in other words their flow cross-sections are equal and they are of equal length.

In this way the distribution canal network of the nozzle unit has a large number of flow division sections as well as a large number of flow canal sequences of decreasing flow cross-section in flow direction, beyond each of which is always one or more nozzles. In this way the nozzle unit contains innumerable flow canal zones in which a clot or even a partial clot that significantly weakens glue flow will cause the flow of glue from one or many nozzles to cease or at least significantly decrease. This will immediately lead to an unsatisfactory distribution of glue to the surfaces to be glued and often to the rejection of produced products.

The object of the invention is to remove the above-mentioned disadvantages. In particular the object of the invention is to disclose a new type of nozzle unit structure that enables a nearly clot-free nozzle structure that guarantees the even distribution of glue under essentially all conditions.

The characteristics of the invention will be referred to in the claims.

A nozzle unit according to the invention that is intended for spreading foamed glue on flat surfaces in the production of wood-based sheets, has a feeder canal for directing glue into the nozzle unit, a row of nozzles for directing glue from the nozzle unit onto a flat surface and a distribution canal network between the feeder canal and the nozzles for distributing glue evenly to the nozzles. Preferably the distribution canal network is composed of successive canal zones such that one flow canal of a canal zone always divides in the next canal zone into at least two flow canals. According to the invention, the area of the distribution canal network has a compensation canal closed to/from external flow that forms a free flow channel between branches of the distribution canal network leading to the nozzles. Thus, according to the invention, the flow canals of a distribution canal network are joined at a suitable location by a compensation canal that does not receive glue from outside and does not direct glue out of the nozzle unit, rather it serves only to suitably even out, glue flows between different flow canals within the nozzle unit and in this way during a possible clot or flow decrease situation in some part of the canals it directs compensational flows from other flow canals to the clotted area. This way clots or decreases in flow developed in the distribution canal network before the compensation canal are entirely eliminated and the flows of glue to the nozzles are made to remain even.

Preferably the compensation canal is arranged in a particular canal zone where it connects all flow canals of equal cross-section of this canal zone to one another. In one preferred embodiment the compensation canal is arranged just before the nozzles or in other words in the last canal zone.

Preferably one canal zone just before the nozzles has a vent that simultaneously opens and shuts each of the canals. In this case it is possible that the compensation canal is arranged in the canal zone before the vent, but it may also be in conjunction with the vent or in other words in the same canal zone as the vent.

Preferably the nozzle unit has connections between the return canal and the vent that direct glue into the return canal when the vent closes the nozzles. In this way regardless of the position of the vent and the use and flow of glue through the nozzles, glue is constantly made to flow within the distribution canal network, which will significantly reduce possible clots.

Although it is possible that the compensation canal connects to one another distribution canals of different size and flow properties, it is however advantageous that the flow canals connected to one another by the compensation canal are of equal flow cross-section.

An essential characteristic of the compensation canal is its flow-evening influence. Because of this its resistance of flow is preferably as small as possible. In this way preferably the flow cross-section of the compensation canal is essentially larger than the flow cross-sections of the distribution canals it connects to one another. In the same way preferably the compensation canal is as simple in shape as possible, straight and without curves, so that it does not create unnecessary flow resistances.

It is also possible that the same nozzle unit has at least two different compensation canals in at least two different canal zones. The compensation canal can be joined to different portions of the distribution canals of the canal zone such as to the beginning of a particular canal zone, in other words to the site of branching of a distribution canal, or to its curve, its straight horizontal section or its straight vertical section.

A nozzle unit according to the invention has significant advantages in comparison to prior art. A compensation canal according to the invention guarantees essentially even flow of glue from all nozzles even at times when a flow canal of some canal zone has a narrowing that weakens flow or a clot that completely blocks flow. In this way the invention guarantees an adequately even gluing result, which significantly increases even and assured continuation of production by preventing breaks in production and the production for sale of products of unacceptable quality.

Figure 2:
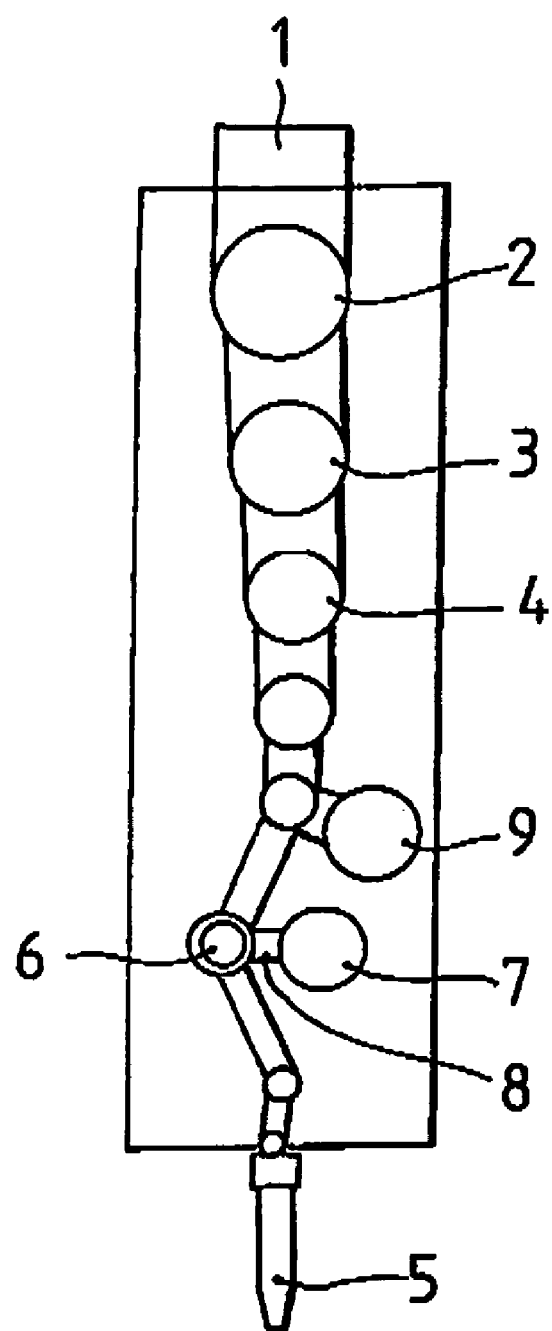

In the following, the invention is described in detail with references to the accompanying drawings, in which FIG. 1 shows schematically a front view of a nozzle unit according to the invention, and FIG. 2 shows a side view of the nozzle unit.

FIG. 1 shows an exposed half-section of a nozzle unit structure according to the invention. The feeder canal 1 first divides into two flow canals 2, whose flow cross-sections are together equal to the flow cross-section of the feeder canal 1. In this way the flow canals 2 compose the first canal zone.

Further both flow canals 2 divide into two equal-sized flow canals 3, these then divide into two equal-sized flow canals 4 and so on so forth, such that the distribution canal network is composed of seven canal zones each of which contains twice as many flow canals compared to the previous canal zone. The flow canals of the last canal zone lead to the nozzles 5.

As can be seen from the drawings, through all the flow canals of one canal zone travels a joint vent 6. When the vent is used it opens or closes the flow canals to the nozzles 5. In the same way near the vent 6 is a return canal 7 and the vent contains connections 8, that direct glue flow from the vent to the return canal at times when the glue is not being directed to the nozzles 5. The vent used may be in itself of any structure whatsoever, so it is not shown in more detail in this connection.

Additionally in this embodiment each of the flow canals in the canal zone before the vent is connected by a compensation canal 9 having larger flow cross-section than these flow canals. The compensation canal is an otherwise closed space, in other words glue may flow into the compensation canal only from flow canals within the same canal zone. In the same way glue may flow from the compensation canal only into flow canals within the same canal zone. In this way the compensation canal is able to direct and move flows of glue only between different flow canals within the same canal zone and in a manner dictated by the pressure conditions present therein.

The functioning of a nozzle unit according to the invention shown in the drawing is described in the following. Under normal gluing conditions foamed glue flowing from the feeder canal constantly divides in the area of the distribution canal network into two smaller flows of glue such that in the end the glue flow pushes out in even and equal flows from many adjacent nozzles 5. When it is desired to stop the flow or in other words stop the flow of glue from the nozzles, the vent 6 is used to seal off the flow channel to the nozzles and open through the connections 8 a flow channel leading to the return canal 7. In this way glue can constantly flow within the distribution canal network, which decreases the likelihood of clogs in the canal network.

However clogs or at least partial clogs resulting in decreased flow may still occur. These will cause glue to flow to the nozzles unevenly. If there is a clot somewhere in a flow canal, behind it flow will stop or become very slight. In this case glue is able to flow through the compensation canal into the distribution canal network behind the clot. In this way the nozzles receive an essentially even flow of glue, which guarantees an adequately even gluing result and uninterrupted production.

In the foregoing, the invention is described in detail with the aid of the accompanying drawings with different embodiments of the invention being possible within the scope of the inventive concept defined by the claims.

The invention claimed is:

1. A nozzle unit for spreading foamed glue onto a flat surface in the production of wood-based sheets, the nozzle unit comprising:
   a feeder canal for directing the glue into the nozzle unit,
   a plurality of nozzles for directing the glue from the nozzle unit onto the flat surface, and
   a distribution canal network between the feeder canal and the nozzles for distributing the glue evenly to the nozzles, wherein the distribution canal network comprises:
      a plurality of successive flow canal zones, each zone comprises flow canals such that each flow canal within each zone divides into at least two flow channels in a successive canal zone, and
      a compensation canal connected to the flow canals of one of the canal zones, wherein the glue flows into the compensation canal only from the flow canals within the one canal zone, wherein the glue flowing in the compensation canal is available for flow into any of the flow canals within the one canal zone,
   wherein one canal zone before the nozzles comprises a valve that opens and closes the canals in that canal zone, and the nozzle unit further comprises a return canal and the valve comprises connections that direct the glue to the return canal when the valve closes the nozzles.

2. A nozzle unit according to claim 1, wherein the compensation canal is arranged in the last canal zone before the nozzles.

3. A nozzle unit according to claim 1 wherein the flow canals connected to the compensation canal are of equal flow cross-section.

4. A nozzle unit according to claim 1, wherein the flow cross-section of the compensation canal is larger than the flow cross-section of the flow canals that it connects to one another.

5. A nozzle unit according to claim 1, wherein the nozzle unit has the compensation canal in at least two different canal zones.

* * * * *